June 6, 1944.  N. I. PERRY  2,350,416

FLUID DRIVE

Filed Jan. 29, 1943  2 Sheets-Sheet 1

Inventor
Nelson I. Perry
by
Attys.

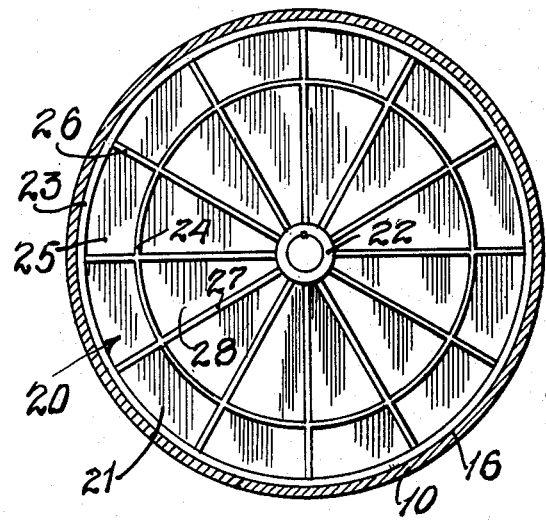
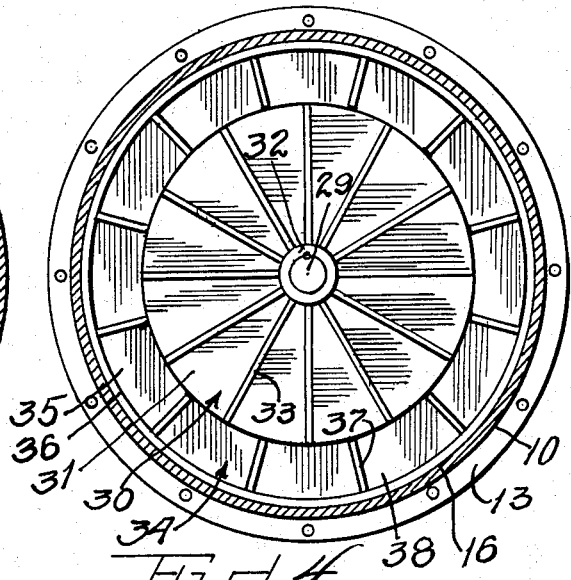
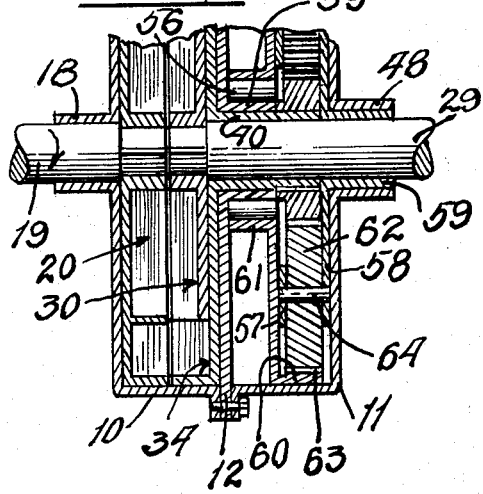
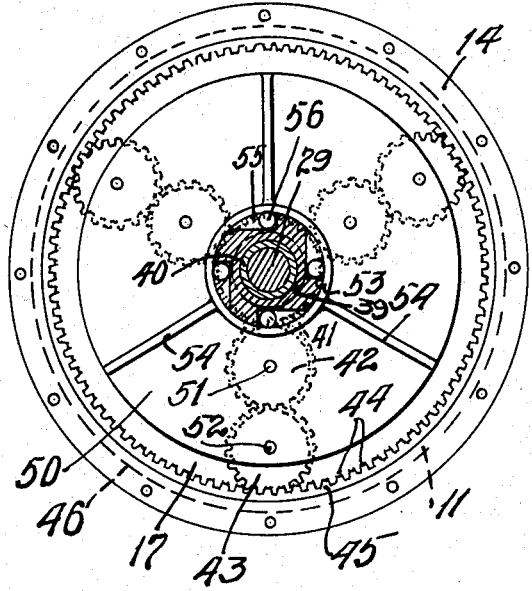

Patented June 6, 1944

2,350,416

UNITED STATES PATENT OFFICE 2,350,416

FLUID DRIVE

Nelson I. Perry, Chicago, Ill.

Application January 29, 1943, Serial No. 473,966

2 Claims. (Cl. 74—189.5)

My invention relates to a fluid drive or transmission of general utility for transmitting power from a driving element to a driven element, but designed particularly for use on automobiles, trucks, ships, or other vehicles where a smooth automatic velvety acceleration, without any gear shifting, is desired.

An important object of the invention is to provide a compact unitary transmission assembly in which a driven impeller element is hydraulically coupled to a pair of runner elements rotatable independently of each other, with one of the runner elements directly connected to a driven shaft and the other runner element connected with the driven shaft through reduction gearing for hydraulic starting of the driven shaft until direct hydraulic drive of the driven shaft is taken over by the directly connected runner element.

A further object of the invention is to provide clutch mechanisms for permitting power drive of the driven shaft by the primary or starting runner element until a secondary or direct drive runner element becomes fully effective for direct drive of the driven shaft so that when the rate of rotation of the secondary runner exceeds that of the starting runner, the reduction gearing will idle, but will be ready to resume power drive of the driven shaft as soon as the rotation rate of the secondary runner falls below that of the primary runner.

Still another object is to provide a compact transmission assembly in which one side of a housing contains the impeller and runner elements, and the other side of the housing contains the reduction gearing and the clutch means, with the driving shaft and the driven shaft extending in axial alignment from opposite sides of the housing for convenient interposition of the transmission assembly in a transmission line.

The various features of the invention are embodied in the structure shown on the drawings, in which Figure 1 is a diametral cross-section of the assembly;

Figure 2 is a section to reduced scale on plane II—II of Figure 1;

Figure 3 is a section to reduced scale on plane III—III of Figure 1;

Figure 4 is a section to reduced scale on plane IV—IV of Figure 1; and

Figure 5 is a diametral section of a modified assembly.

Figure 1:
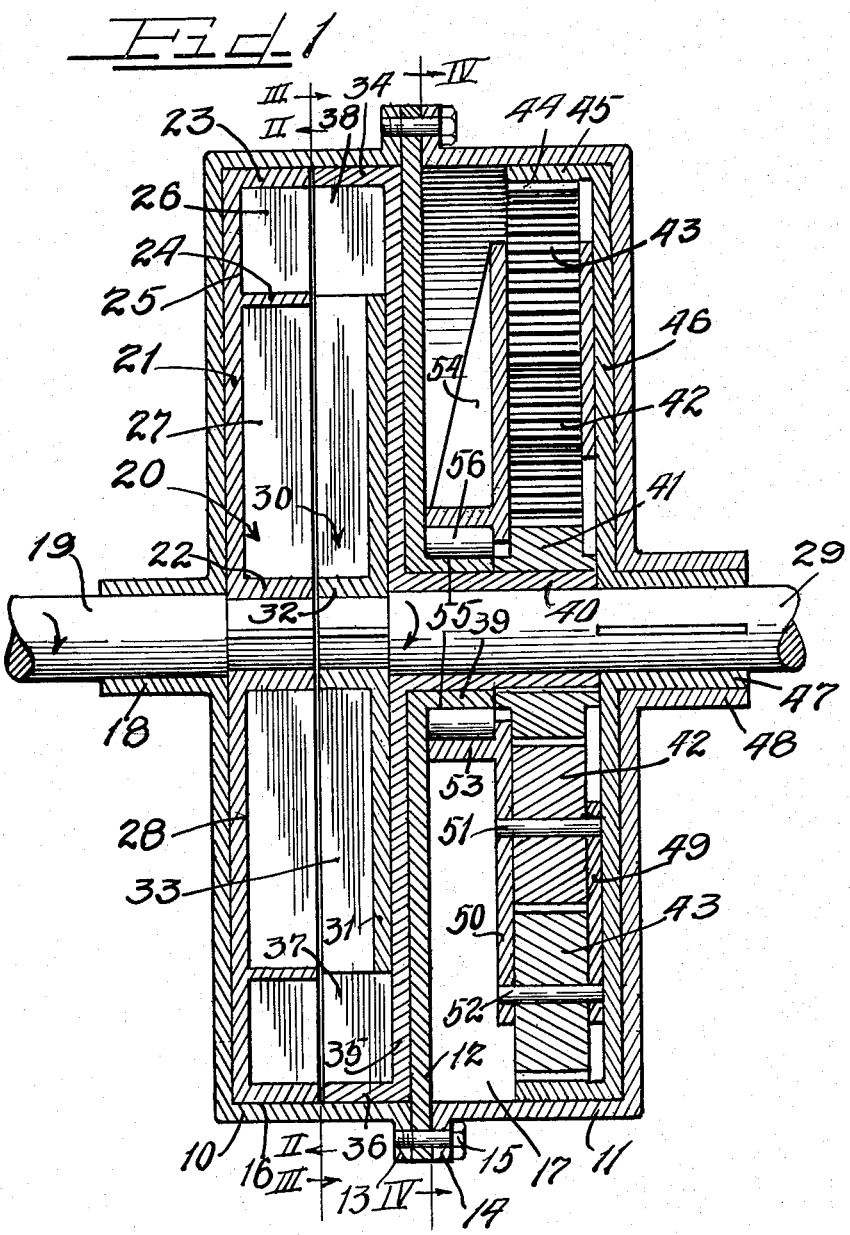

The housing for the transmission assembly comprises the cylindrical cup shape frames 10 and 11 and the wall or plate 12 forming an inner closure for the frames and projecting between flanges 13 and 14 on the frames with bolts or screws 15 extending through the flanges and the wall 12 to secure the frames and wall rigidly together.

The frame 10 with the wall 12 defines a cylindrical space 16 and the frame 10 with the wall 12 defines a cylindrical space 17. The outer wall of the frame 10 has the bearing extension 18 for the drive shaft 19 which extends into the cylindrical space 16 and has keyed thereto the impeller element 20, this impeller element occupying the outer half of the cylindrical space. The impeller element is of a diameter to fit the cylindrical wall of the frame 10, and has the outer wall 21 extending between the hub 22 and the cylindrical flange 23. Inwardly of this outer flange 23 a circular flange 24 extends from the wall 21, the space between the flanges being subdivided into compartments 25 by radial walls 26. Radial walls 27 extend from the wall 21 between the hub 22 and the flange 24 to define compartments 28.

The driven shaft 29 extends through the frame 11 and into the cylindrical space 16 and has keyed thereto the secondary or direct driving runner 30. This runner comprises the circular wall 31 and the hub 32 which is secured to the driven shaft, and extending from the wall 31 between the hub and the outer periphery of the wall are the radial vanes 33, the outer ends of the vanes and the wall 31 being in axial alignment with the flange 24 on the impeller element.

In the inner half of the cylindrical space 16 is also located the primary or starting runner 34 which comprises the circular wall 35 interposed between the wall 31 of the runner 30 and the wall 12 of the housing structure, the wall 35 having the inwardly extending peripheral flange 36 engaging the cylindrical wall of the frame 10, and extending from the wall 35 and the flange 36 are the radial vanes 37 defining compartments 38, these vanes extending laterally up to the periphery of the runner 30.

The housing wall 12 has the bearing extension 39 projecting into the cylindrical space 17 and journalling the hub 40 extending from the wall 35 of the runner 34 through the cylindrical space 17, this hub receiving the driven shaft 29 but being free to rotate thereon. On its outer portion the hub 40 has keyed thereto a sun gear 41 which meshes the transmission gear 42, which is in mesh with another transmission gear 43 which meshes with the internal teeth 44 of the annular gear ring or flange 45 on the wall 46. The annular gear flange 45 engages the cylindrical wall of the frame 11 while the wall 46 engages against the outer wall of the frame and has a hub 47 extending outwardly therefrom for bearing engagement in the bearing extension 48 on the outer wall of the frame 11, the hub 47 being keyed to the driven shaft.

One or more sets of transmission gears 42 and 43 may be provided, three such sets being shown spaced equal distance apart. The transmission gears are disposed within a cage structure comprising the outer annular wall 49 and the inner annular wall 50, the gears 42 and 43 of the sets being journalled on pins 51 and 52 respectively, supported by the cage walls. The inner cage wall 50 has the cylindrical hub 53 extending inwardly therefrom up to the housing wall 12 to surround the bearing extension 39 on said wall, and this cage wall 50 may be strengthened by ribs 54. The bearing extension 39 forms the inner part and the surrounding hub 53 of the cage forms the outer part of a one-way brake, the bearing extension having the tangential recesses 55 for the brake rollers 56, as clearly shown on Figure 4. With this arrangement the cage structure may rotate in counter-clockwise direction (Figure 4) on the bearing extension 39 but is held against clockwise rotation thereon.

Describing now the operation, the driving shaft 19 may be coupled to a driving source such as an automobile engine, while the driven shaft 29 may be connected with the driving axle of the vehicle with the interposition of a reversing gearing (not shown), and a clutch (not shown). The cylindrical space 16 is filled with hydraulic fluid such as oil, and the cylindrical space 17 may have sufficient oil therein for lubrication of the gearing and the shaft bearings. When the engine is started, the impeller 20 will rotate, while the driven shaft 29 will primarily be held at rest due to inertia of load thereon. As the impeller is rotated, the impact and friction drag of the oil from the impeller compartments 25 against the vanes 37 of the primary or starting runner 34 will cause rotation of this runner and of the sun gear 41, and, as the transmission gear cage is locked by the brake against clockwise rotation when the drive shaft rotates in clockwise direction, the transmission gears 42 and 43 will cause rotation of the annular gear 45 which is keyed to the driven shaft so that the driven shaft will be gradually started and its rotation accelerated as the speed of the runner element 34 increases. At the same time, the vanes 27 of the impeller discharge oil against the vanes 33 of the direct driving runner 30 and the impact and friction drag of the oil will rotate the runner 30 which is keyed to the driven shaft 29 so that this runner element will be directly hydraulically driving the driven shaft while the starting runner 34 is exerting drive on the driven shaft through the reduction gearing. We thus have two hydraulic drives for the driven shaft rotatable independently of each other with one hydraulic drive directly connected to the driven shaft and the other through reduction gearing, for bringing the driven shaft up to speed, and as soon as the rotation speed of the direct driving runner equals or exceeds the rotation speed afforded by the primary runner through the reduction gearing, the brake will unlock and the transmission gear cage may rotate bodily with the driven shaft and will function as a fly-wheel. However, as soon as the speed of the direct drive drops below that afforded by the primary runner through the gearing, the brake will engage for functioning of the gearing and the primary runner will bring the driven shaft back to speed for direct hydraulic drive thereof by the runner 30.

In my improved arrangement, the hydraulic slippage between the impeller and the runner element is at a minimum so that, after starting of the engine, the direct drive is automatically quickly brought into operation at substantially engine speed. With the housing arrangement shown, upon withdrawal of the screws 15, the transmission assembly may be quickly taken apart, and as readily reassembled.

In the modified arrangement shown on Figure 5, there is the same housing arrangement and the same arrangement of the impeller and runner elements, but the arrangement of the reduction gearing is somewhat modified. The gearing cage has the flat annular inner wall 57 and its outer wall 58 has the extension 59 projecting through the bearing extension 48 on the housing 11, the extension 59 being keyed to the driven shaft 29. The annular or ring gear element 60 has the inwardly extending cylindrical hub 61 which surrounds the extension 39 on the housing wall 12 and forms the outer wall of the brake, the brake rollers 56 being interposed between the hub and the extension. Within the gearing cage is a single transmission gear 62 meshing with the teeth 63 on the annular gear member 60 and with the sun gear 41 which is driven by the runner 34, the transmission gear being journalled on a pin 64. When the driving shaft 19 is driven in clockwise direction, looking from the left of Figure 5, the starting runner 34 will be hydraulically driven in the same direction and the gear 41 will rotate the gear 62 in counter-clockwise direction. The arrangement of the brake element is such the annular gear element 60 will be locked against rotation in counter-clockwise direction and the transmission gear 62 will therefore travel along the annular gear for bodily rotation of the cage structure in clockwise direction and turning of the driven shaft 29 in clockwise direction. While the driven shaft is being rotated through the gearing, the runner element 30 on the driven shaft will be hydraulically rotated by the impeller 20, and as soon as the direct driving speed by the runner 30 exceeds the driving speed by the runner 34 through the gearing, the brake will be released and the cage and the annular gear will rotate as a unit with the driven shaft. As soon as the direct driving speed lags, the gearing will again become effective and will tend to bring the speed back. The releasable or overrunning brake will take hold automatically any time when power is applied and when the speed of the direct drive drops lower than the speed given to the driven shaft through the reduction gearing assembly, thus automatically giving power at lower gear ratio as in climbing hills, hard pulling and faster acceleration at low speed or starting, without the slightest break in continuity of applied power.

I have shown practical and efficient embodiments of the feature of my invention but do not desire to be limited to the exact structure and arrangement shown and described as changes and modifications may be made without departing from the scope of the invention.

I claim as follows:

1. A unitary fluid drive assembly comprising a cylindrical housing having a dividing wall intermediate its ends dividing the housing into a hydraulic chamber and an adjacent gearing chamber, a drive shaft extending into the hydraulic chamber and an impeller element in said chamber secured to the driving shaft, said hydraulic chamber being filled with hydraulic fluid, a driven shaft extending through said gearing chamber and into said hydraulic chamber, a secondary runner in said hydraulic chamber secured to the driven shaft and opposed to said impeller element, a primary runner in said hydraulic chamber having a hub extending therefrom through said gearing chamber to receive said driven shaft, a sun gear secured to said primary runner hub, an annular gear in said gearing chamber secured to said driven shaft, an annular gearing cage in said gearing chamber, transmission gears journalled in said cage between said sun gear and said annular gear, and a one-way brake in said gearing chamber connecting said cage with said housing dividing wall.

2. A unitary transmission assembly comprising a cylindrical housing with a dividing wall therethrough to define a hydraulic cylinder and a gearing cylinder, a driving shaft extending into said hydraulic cylinder from the outside thereof and a vaned impeller in the outer part of said cylinder secured to the driving shaft, a driven shaft extending through said gearing cylinder from the outside thereof and into said hydraulic cylinder, a starting runner in the inner portion of said hydraulic cylinder space having an extension therefrom through said gearing cylinder space and receiving said driven shaft and having vanes subjected to the hydraulic fluid displaced by said impeller, a direct driving runner in the inner portion of said hydraulic cylinder and disposed between said starting runner and said impeller and secured to the driven shaft and having vanes subjected to the fluid displaced by the impeller, an internal annular gear member in said gearing cylinder secured to said driven shaft, a sun gear on said starting runner extension, an annular cage structure and gears journalled therein for connecting said sun gear and annular internal gear member, and a one-way brake connecting said cage with said dividing wall of said housing.

NELSON I. PERRY.